March 13, 1951

M. W. MILLER 2,544,713

AUTOMATICALLY ADJUSTABLE ROTARY
TURBINE-TYPE HYDRAULIC COUPLING

Filed Oct. 16, 1945

*INVENTOR.*
MERLE W. MILLER

BY

*William D. Hall*

ATTORNEY

Patented Mar. 13, 1951

2,544,713

UNITED STATES PATENT OFFICE 2,544,713

AUTOMATICALLY ADJUSTABLE ROTARY TURBINE-TYPE HYDRAULIC COUPLING

Merle W. Miller, Philadelphia, Pa.

Application October 16, 1945, Serial No. 622,653

5 Claims. (Cl. 60—54)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to power transmission and more particularly to hydraulic drives for motivating equipment coupled thereto.

While various hydraulic transmission drives and clutches have been developed and used over a considerable period of time, it is an essential requirement that such mechanisms include the continuous use of gearing or the equivalent, for the purpose of transmitting driving power from a motor of any type through them to the driven apparatus. This arrangement has the disadvantage of being cumbersome, expensive and subject to damage, to an extent that detracts from its use. In addition, the use of such drives involves more attention on the part of the operator than is desirable.

It is an object of this invention to provide a new and improved hydraulic drive that will avoid one or more of the disadvantages and limitations of the prior art.

Another object of the present invention is to provide a new and improved hydraulic drive that will avoid the normal and continual requirement of gearing for the transmission of power from a driving source through it to a driven one, and which will have the facility of automatically adjusting itself to suit the load and speed requirements involved in a proportionate manner.

An additional object of the invention is to provide a new and improved transmission drive that will operate promptly and smoothly, and be protected against damage by clogging caused by the breaking of parts within its structure subject to abnormal wear.

In a particular form of the invention a hydraulic drive mechanism comprises a housing filled with a transmission fluid, with a driving propeller means, or impeller, operable in said fluid in the housing and having converging vanes thereon. A driven propeller means, or turbine, operable in said fluid but spaced from the driving means in variable relation thereto having converging vanes thereon is also included. Centrifugal means operable with said driving and driven means is arranged to control the positioning of the same in variable relation to each other, in accordance with the relative speed of each and the delivering power from the driving means, in a proportionate relation to the positioning through the transmissive reactions of the fluid.

It can be appreciated that the structure may also include resilient means connected with said propeller means for positioning same predeterminedly and providing coordinate response in said centrifugal means. That means may also be used for keeping the propeller means in alignment and providing limits of travel of same towards each other.

For a better understanding of the present invention together with further objects thereof, reference is had to the following description, taken in connection with the accompanying drawing, in which a particular form of the invention is detailed while the scope of the invention is particularly pointed out in the claims. Referring to the drawing in which a preferred form of the invention is indicated:

Similar reference characters refer to similar parts throughout the drawing.

Figure 3:
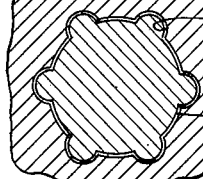
Figure 3 is a transverse sectional view through one of the shafts and propeller, employed in this embodiment.
Figure 1:
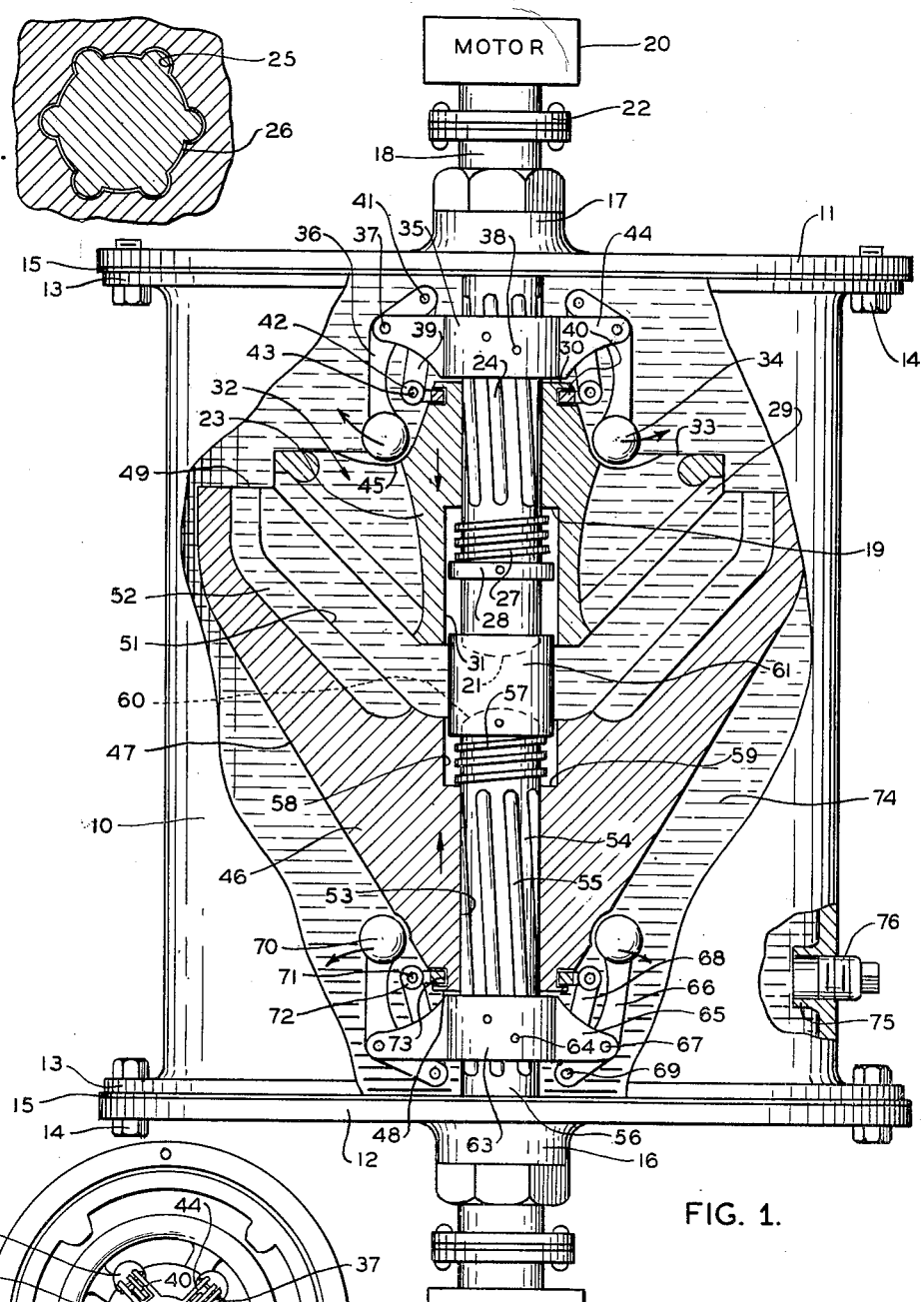
Figure 1 is an elevational view partly in section of a hydraulic transmission drive embodying this invention; parts being broken away to show the internal construction.
Figure 2:
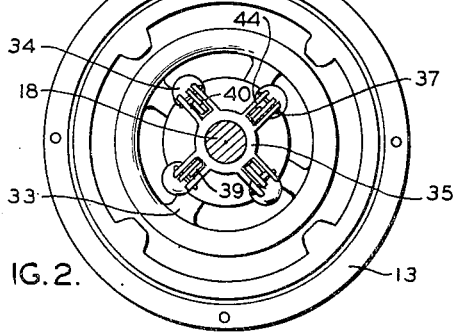
Figure 2 is a plan view of Figure 1 with the cover removed.

In the particular form shown in the drawing and referring especially to Figure 1, a cylindrical casing 10, together with a bottom plate 12, and a cover 11, form the main housing of the drive mechanism. The plate 12 and cover 11 are secured to external flanges 13 of the casing by bolts 14. Suitable gaskets 15 are interposed to provide means for keeping the housing leakproof. The cover 11 is surmounted by an exterior stuffing box 17 for leakproofing a driving shaft 18 passing through it into the housing. On the outwardly extending portion of the shaft is a rigidly attached conventional flexible coupling 22. This coupling 22 is also connected to the shaft coming from a motor or engine 20, so that the latter can revolve the driving shaft 18, and incidently the driving propeller or impeller 23, which it passes through centrally. The portion of the shaft within a central passage 26 of the propeller 23 has ribs 24 longitudinally arranged at a relatively slight angular or helical tilt with respect to the direction of the axis of the shaft. The ribs are equally spaced peripherally around the shaft 18. These ribs 24 slidably fit into flutings 25 in the wall of the cylindrical passage 26 which are likewise slanted to correspond with those of the ribs 24. An enlarged cylindrical recess 31 is provided at the end of the passage 26 in the propeller 23 and serves as a chamber in which a flat coil spring 27 can tension the propeller 23 on the shaft 18 against movement in a direction away from plate 11. The shaft 18 is not movable in a longitudinal direction, although it is free to rotate about its axis. It supports the spring 27 through a collar 26 fastened to the shaft rigidly. The opposite end of the spring presses against the horizontal surface 19 of the recess 31, all as indicated in the drawing. The lower end portion of the shaft 18 has a rounded or arcuate surface 21. The propeller 23 is of a converging shape somewhat like that of a bevel gear, with vanes 29 instead of gear teeth and passages 32 through the structure between the walls supporting the vanes. The passages serve as ducts for circulation of the fluid used in the housing. The vanes have converging sides. The wall surfaces at the back of the passages are arcuate, tapering towards the converging end of the propeller to facilitate circulatory action. The widened portion of the propeller 23 has a generally flattened top surface 33 in a horizontal plane arcuately depressed at predetermined locations 45 for weights 34 to come to rest in. A tapering boss rising integrally from the surface 33 is provided with a peripheral groove in which an eye-ring 40 can revolve. The upper surface 30 of the boss 29 is flat and supports a circular bracket 35 having a series of spaced bifurcated arms 44 radially projecting therefrom for pivotally holding bell-cranks 36 on pins 37. This bracket is rigidly secured to the shaft 18 by rivets 38 and rotates with it. The bell-cranks 36 support the weights 34 on the ends of their long arms, while their short arms are pivoted to links 39, on the pins 41. The links 39 are held to eye-ring 40 at its eyes 42 by pins 43, spaced apart in accordance with the spacing of the links 39 and arms 44 from each other. The above details the general structure of the driving propeller unit. It should be noted however, that the terms "driving" and "driven" are of identification for this example and not necessarily of fact as the driving or driven mechanisms can be operated interchangeably. Operating in conjunction with the driving propeller is a driven propeller unit. This latter unit consists of a hollowed-out driven propeller, or turbine 46 converging internally and externally. Externally it has a quasi-conical peripheral surface 47 leading to a flat bottom surface 48 where it is restricted. At the widened end, it is tangent to the side contour of surface 47 terminating in a flat and horizontal plane 49 all as indicated in Fig. 1. The converging internal surface 51 is also formed similarly to the peripheral surface 48 and has vanes 52 likewise made surmounting it. These vanes 52 have converging sides similar to those of the vanes 29 but do not have peripheral apexed edges. A central passage 53 is provided in the propeller 46 suitably fluted on a slight angular slant to slidably engage the ribs 55 on a cylindrical shaft 56 that fits and slides helically therein. The inward end portion of the passage 53 ends in an enlarged recess 58 to receive a flat coil spring 57. This spring 57 resiliently braces itself between the horizontal wall 59 of the recess 58 and sleeve 61 rigidly fixed to the shaft 56 to keep the latter under tension, and stay it in its normal predetermined position in the propeller 46. The rounded end 60 of the shaft 56 is aligned with the rounded or arcuate surface 21 of the shaft 18. The sleeve 61 serves to align the shafts 18 and 56 and propellers 23 and 46 together to provide a floating action during the travel movements of the propellers 23 and 46. A secondary bracket 63 is rigidly secured by rivets 64 to the shaft 56 and has a central fluted passage therethrough to allow the shaft to be keyed thereto by its ribs 55 and cause it to rotate in synchronism with the shaft on its axis. The bracket 63 has arms 65 which pivotally support bell-cranks 66 on pins 67. The short arms of the bell-cranks are pivoted to the eyes 71 of an eye-ring 72 slidable around in a peripheral groove 73 in the restricted portion of the propeller 46. Weights 70 are secured to the long arms of the bell-cranks 66. The fluid 74 is used for transmission purposes and fills the housing 10. The housing is provided with a screw filling plug 76 installed in its wall as indicated in the drawing. A boss 75 is arranged on the inside surface of the housing to provide a retaining space that will allow a certain amount of air to be trapped within the housing when the same is filled with fluid 74. The trapped air serves as a safety precaution if the fluid is heated and expands excessively during operation.

The operation of the device is as follows: the motor 20 is connected through the coupling 22 to the shaft 18 and rotates the same at a predetermined speed. The shaft 18 through its ribs 24 acting in the flutings 25 causes the propeller 23 to rotate so that its vanes 29 stir up the fluid 74 within the housing. At the same time the bracket 35 rotates with the shaft. This revolves the bell-cranks 36 and induces a centrifugal action, causing the weights 34 to fly outwardly in the direction of the arrow. This in turn causes the shorter arms of the bell-cranks to press down on the links 39. The pressure is transmitted to the eye ring 40 which propels the propeller in the direction of the arrow on the shaft 18 towards the middle of the housing, overcoming proportionate tension of the spring 27 by doing so. The vanes 29 of the propeller during their rotation against the fluid 74 they are immersed in, causes a circulation thereof in the direction of its rotation. This circulation of the fluid passes to and against the vanes 52 of the driven propeller 46 and tends to rotate them, increasing in effect as the vanes of the driving propeller 23 are forced further down into the housing closer to them by the centrifugal mechanism. As the vanes 52 of the propeller 46 are rotated by the pressure and surface tension action of the fluid thereon, the propeller 46 rotates in the same direction, and in turn, revolves its bracket 63. This in turn causes the rotation of the secondary centrifugal mechanism consisting of the links 68, bell-cranks 66 and weights 70. The weights 70 move outwardly under centrifugal force and force the bell-crank, link and eye ring to push the propeller 46 toward the driving propeller 23. The vanes of both propellers are brought in closer proximity and thereby increase the driving reactions between the two. The position the collar 28 and the sleeve 61 over the ends 21 and 60 of the shaft 18 and 56 respectively, limits the travel of the propellers towards each other so as to prevent the respective vanes of the propellers 23 and 46 from striking each other.

When the driving shaft 18 is rotated from the motor 20 it also turns in the propeller 23 a slight amount due to the helical rib twist in the helical flutings of the propeller as it graps hold thereof. This overcomes the inertia of the propeller in a gradual but effective manner and affords a smoother operation than would be obtained from straight ribs and flutings or a key. The coordinated centrifugal mechanism acting under the force induced by the weights 34 not only performs its function of moving the propeller downwardly against the cushioning effect of the spring 27, but also has a paddling effect on the fluid 74, in which all the mechanisms are immersed, which partially coordinates with the propeller reaction of the vanes, on the fluid in front of them during rotation. The circulation induced by the weights 34 and incidental centrifugal mechanism tends to improve the flow through the passages 32 in the propeller and to the vanes, so that the latter can push same freely in front of them, in the direction of rotation. The passages themselves, without the action of centrifugal mechanism facilitate the circulation of the fluid to these vanes.

As the propeller 23 rotates faster, it also moves downwardly further against the resistive tension of the spring 27. In doing so its vanes 29 are brought closer to the vanes 52 of the driven propeller 46. The fluid 74 in motion acts as a flexible drive between the vanes of the propellers. When the driving vanes are brought close to the driven ones they induce a force in the circulating stream of fluid that impinges more effectively against the driven vanes due to its greater kinetic force, its surface tension, and the converging arrangement of the surfaces. The propeller 46 proper is rotated through its integral attachment to its vanes, and it in turn revolves the shaft 56, because of the ribs 55 in the flutings in its central passage. The shaft 56 rotates the bracket 63 fastened to it, which operates the centrifugal mechanism consisting of the weights 70 acting on the bell-cranks 66, which cause the links 68 to exert pressure on the eye-ring 72 in the groove 73 and push the propeller 46 towards the driving propeller 23. This is made possible by the bracket 63 stationary on the shaft 56. The spring 57 normally keeps the propeller close to the plate 12, and provides a substantial space between both sets of vanes. However, when the rotation and fluid transmission position of the propeller 23 is sufficient to cause rotation on the propeller 46 and positions it closer to it, it provides the drag or power to enable the shaft 56 to transmit its power and operate the external equipment coupled to it. The driving propeller 23 is smaller than the driven propeller 46 and which results in a greater leverage for the propulsion of the equipment. The converging portion of the vanes promotes a circulatory effect tangent to their rotation and a frictionally propelling effect on the longitudinal direction of the vanes. The surface tension is utilized to continue the effect of the vane rotation even exteriorly to the space between the vanes, due to the fluid currents created at the upper bend in the driven propeller contour.

While there has been described what is to be considered an improved embodiment of this invention, it will be noted that various changes and modifications may be made therein without departing from the principles and spirit of the invention and coming within the scope of the appended claims.

I claim:

1. A hydraulic transmission drive comprising a housing filled with a transmission fluid, an impeller having a plurality of radially converging vanes operable in said fluid, a turbine coaxial with said impeller having a plurality of radially converging vanes operable in said fluid, said impeller and said turbine being axially displaceable relative to one another, two centrifugal means respectively mounted on and operable with said impeller and said turbine to control the respective relative position and thereby the speed of the latter in accordance with the speed of the former, and means for preventing the vanes of said impeller and said turbine making physical contact with each other.

2. A hydraulic transmission drive comprising a housing filled with a transmission fluid, an impeller operable in said fluid having a plurality of radially converging vanes, a turbine operable in said fluid having a plurality of radially converging vanes, said impeller and said turbine being axially displaceable relative to one another, centrifugal means operable respectively with said impeller and said turbine to control the respective relative position and thereby the speed of the latter in accordance with the speed of the former, means for aligning said impeller and said turbine and for preventing their vanes from making physical contact with each other, said housing being provided with means for permitting expansion of said fluid.

3. A transmission unit of the class described comprising in combination a housing having a liquid therein, an impeller having a plurality of radially converging vanes angularly disposed in relation to the axis thereof, said impeller having a series of grooves therein, a shaft for driving said impeller having peripheral ribs thereon to engage in the grooves in said impeller, a turbine having a central passage having grooves therein and aligned with said impeller, said turbine having a plurality of vanes substantially opposing the vanes of the impeller, a shaft driven by said turbine having a plurality of peripheral ribs in engagement with said turbine grooves, centrifugal means linked with said impeller to urge said impeller toward said turbine and centrifugal means linked with said turbine to urge said turbine toward said impeller.

4. A transmission unit of the class described comprising in combination a cylindrical housing having a transmission liquid therein, an impeller having a plurality of radially converging vanes angularly disposed in relation to the axis thereof, said impeller having a groove therein, a shaft for driving said impeller having a peripheral rib thereon to engage in the groove in said impeller, a turbine having a plurality of vanes substantially opposing those of said impeller, a shaft driven by said turbine having a peripheral rib thereon in engagement with a groove contained in the central passage of said turbine, centrifugal means linked with said impeller to force said impeller toward said turbine and centrifugal means linked with said turbine to force said turbine toward said impeller so as to variably position said impeller and said turbine in accordance with the respective speed thereof.

5. A hydraulic coupling comprising a housing, a driving shaft extending into said housing, an impeller secured to said shaft, said impeller being rotatable with said driving shaft and movable axially relative thereto, a driven shaft extending into said housing and coaxial with said driving shaft, a turbine secured to said driven shaft, said turbine being rotatable with said shaft and movable axially relative thereto, said impeller being provided with a plurality of outwardly extending vanes the peripheral surfaces of which are disposed substantially along a conical surface, said turbine being provided with a plurality of inwardly extending vanes the inner peripheral surfaces of which are positioned along a conical surface, said outer peripheral surfaces of the vanes of the impeller spaced from and substantially opposing the inner peripheral surfaces of the vanes of the turbine, centrifugally motivated means associated respectively with the impeller and turbine for effecting a relative axial displacement of said impeller and turbine so that the greater the speed of rotation of the impeller the less the spacing between the vanes of the impeller and turbine, resilient means to normally urge the impeller and turbine away from each other and a hydraulic medium within said housing and surrounding said impeller and turbine.

MERLE W. MILLER.

REFERENCES CITED

The following references are of record in the file of this patent:

UNITED STATES PATENTS

| Number | Name | Date |
|---|---|---|
| 1,940,918 | Petroni et al. | Dec. 26, 1933 |
| 2,179,149 | Gruenberger | Nov. 7, 1939 |
| 2,313,435 | Headley | Mar. 9, 1943 |
| 2,336,167 | Dillon | Dec. 7, 1943 |
| 2,359,930 | Miller | Oct. 10, 1944 |
| 2,363,952 | Fillmore | Nov. 28, 1944 |
| 2,377,009 | Heyer | May 29, 1945 |
| 2,385,058 | Buthe | Sept. 18, 1945 |
| 2,385,059 | Buthe | Sept. 18, 1945 |
| 2,395,047 | Hanson | Feb. 19, 1946 |

FOREIGN PATENTS

| Number | Country | Date |
|---|---|---|
| 424,395 | Great Britain | Feb. 20, 1935 |
| 452,990 | Great Britain | Sept. 3, 1936 |